Figure 1:
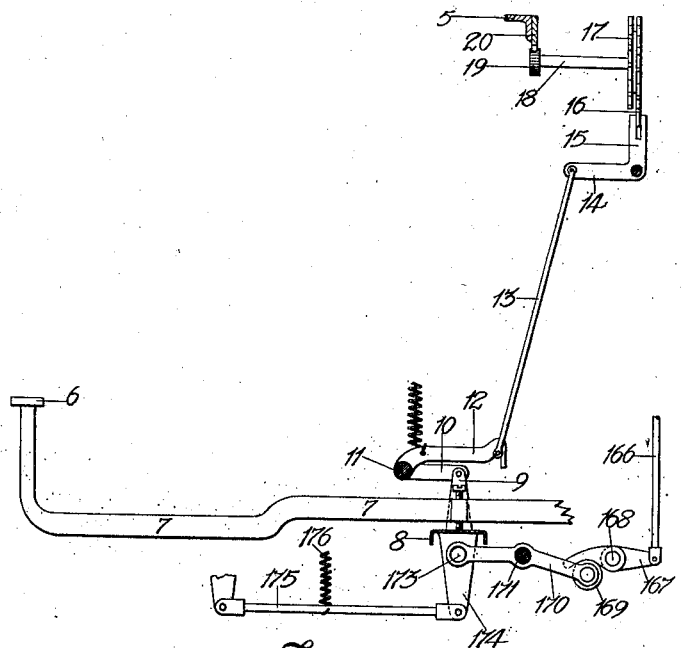

L. H. FRIEDMAN.
TYPE WRITING MACHINE.
APPLICATION FILED FEB. 12, 1912.

1,056,657.

Patented Mar. 18, 1913.
8 SHEETS—SHEET 1.

Witnesses:-
Charles B Crompton
Fred Pohl

Inventor.
L. H. Friedman
By Croydon Marks
Attorney.

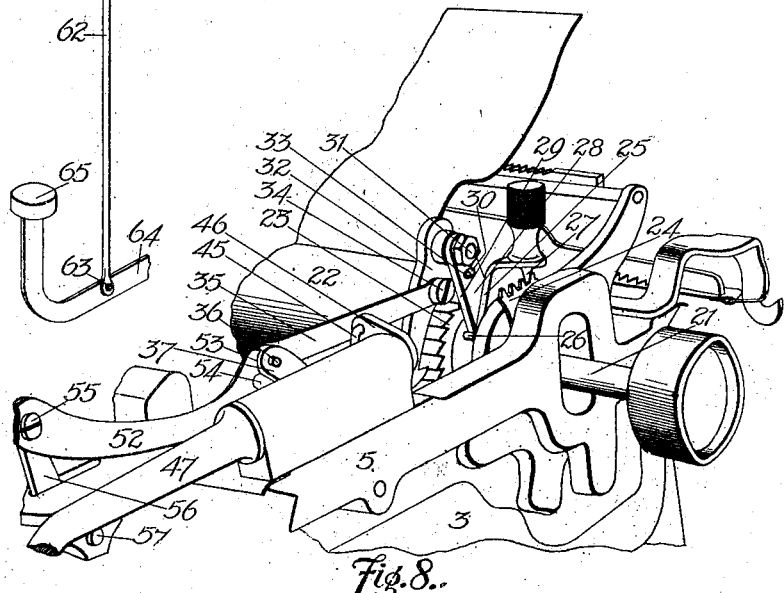

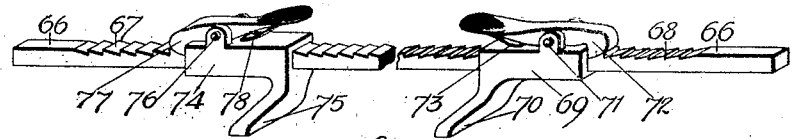
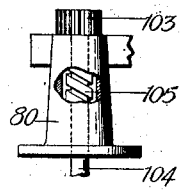
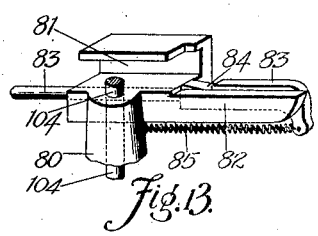
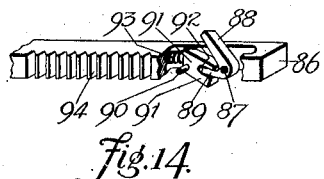
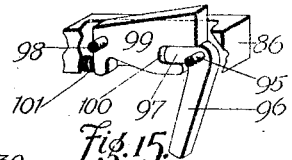
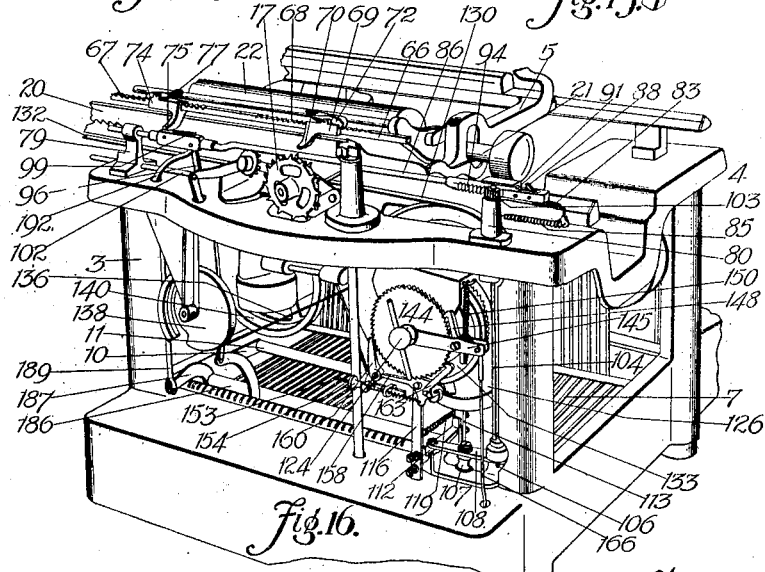

L. H. FRIEDMAN.
TYPE WRITING MACHINE.
APPLICATION FILED FEB. 12, 1912.

1,056,657.

Patented Mar. 18, 1913.

8 SHEETS—SHEET 5.

Witnesses:
Charles B. Crompton
Fred Pohl

Inventor.
L. H. Friedman
By Croydon Marks
Attorney.

L. H. FRIEDMAN.
TYPE WRITING MACHINE.
APPLICATION FILED FEB. 12, 1912.

1,056,657.

Patented Mar. 18, 1913.
8 SHEETS—SHEET 7.

Witnesses:—
Charles B Crompton
Fred Pohl

Inventor.
L. H. Friedman
By Bergdon Mack
Attorney.

L. H. FRIEDMAN.
TYPE WRITING MACHINE.
APPLICATION FILED FEB. 12, 1912.
1,056,657.
Patented Mar. 18, 1913.
8 SHEETS—SHEET 9.
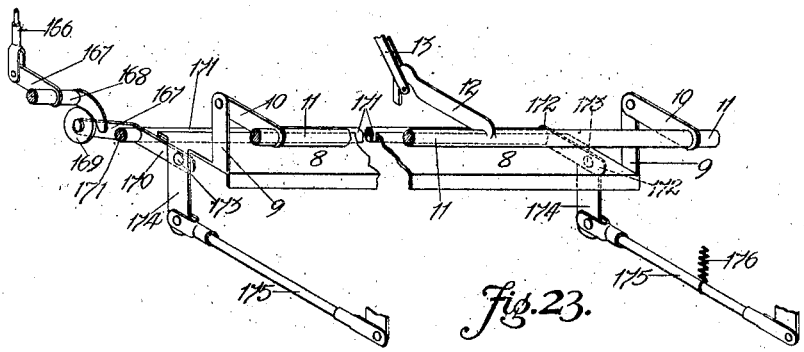
Fig. 23.
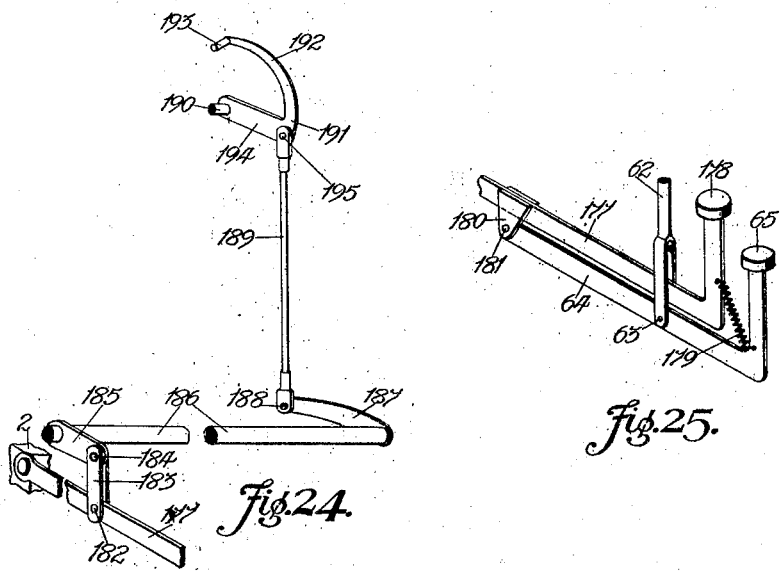
Fig. 24.
Fig. 25.

UNITED STATES PATENT OFFICE.

LESLIE HAROLD FRIEDMAN, OF MELBOURNE, VICTORIA, AUSTRALIA.

TYPE-WRITING MACHINE.

1,056,657.   Specification of Letters Patent.   Patented Mar. 18, 1913.

Application filed February 12, 1912. Serial No. 677,064.

*To all whom it may concern:*

Be it known that I, LESLIE HAROLD FRIEDMAN, a subject of the King of Great Britain and Ireland, and a resident of 268 Albert street, in the post town of East Melbourne, a suburb of the city of Melbourne, in the county of Bourke, State of Victoria, Commonwealth of Australia, have invented certain new and useful Improvements in Type-Writing Machines, of which the following is a specification.

This invention relates to any ordinary class of typewriting machine in which the traveling carriage has to be returned to its commencing point after the completion of each typewritten line, and in which it is also necessary to move the paper roller after each line has been executed. These operations are sometimes performed separately and occasionally together, but under either circumstance it is usually necessary for the operator to remove one hand from the keyboard, causing loss of time and interruption in the sequence of the matter being written.

The primary object of this invention is to automatically return the carriage at the end of each line written, to a predetermined starting point, and to also automatically move the paper roller a predetermined amount, without any interruption. Continuity of writing is thus effected, but should it be desired to return the carriage before its predetermined travel has been accomplished, such movement may be effected. Further, should it be desired to turn the paper roller before the carriage has completed its journey, such movement may be performed; or should it be desired to return the carriage and also to simultaneously move the paper roller before the predetermined journey of the carriage has been finished, such may also be executed, and all without the operator removing a hand from the keyboard. Provision is also made for the paper roller being turned by a hand lever as usual.

A feature of the invention is that the mechanism for returning the carriage automatically may be easily and speedily disengaged permitting the machine to operate as an ordinary typewriter, the paper roller turning mechanism, however, still remaining operative.

Another feature of the invention is the use of but one tension spring to move the carriage in both of its direction of travel. The tension of the spring, further, is maintained automatically.

The invention is applicable to existing machines, with but little alteration, and insures a continuous and uninterrupted execution from the first line typed to the last upon the sheet.

Figure 2:
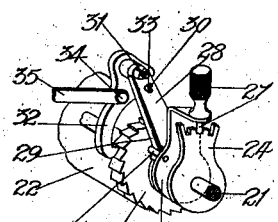
Figure 3:
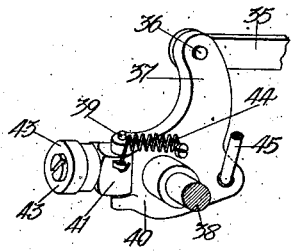
Figure 4:
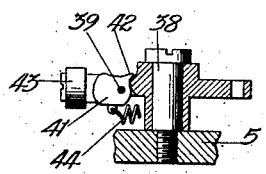
Figure 9:
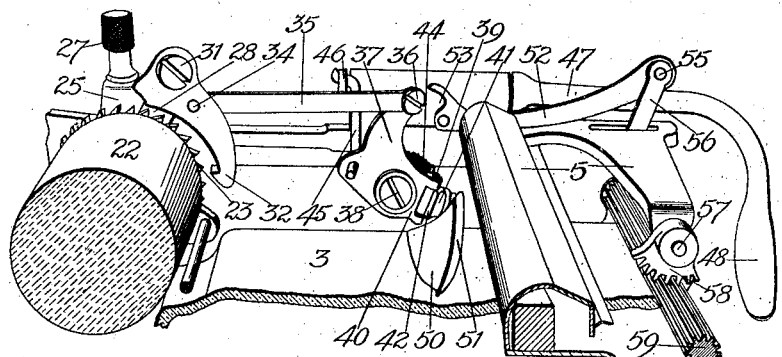
Figure 10:
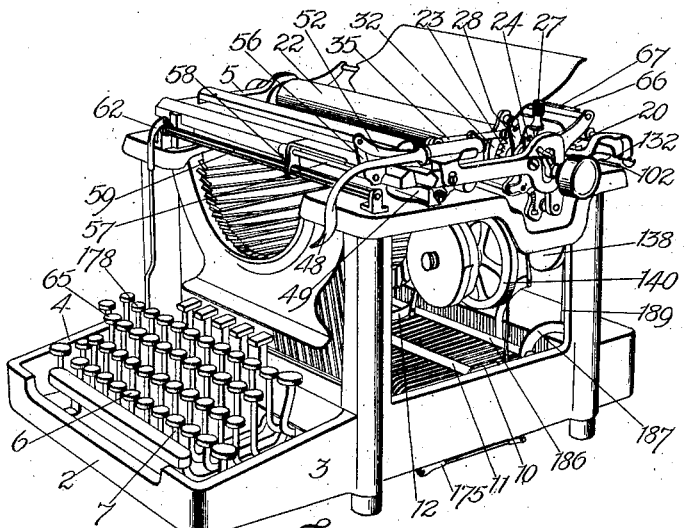
Figure 17:
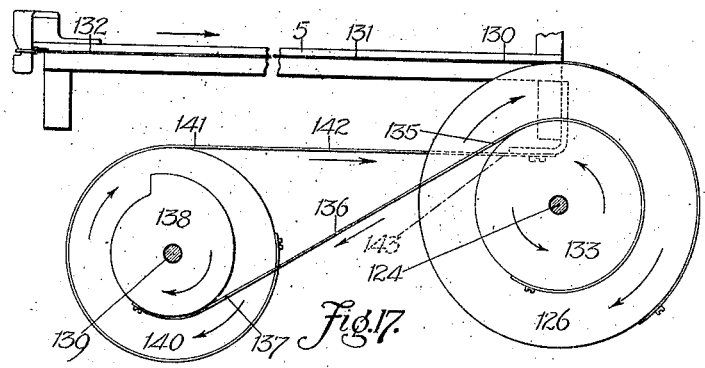
Figure 18:
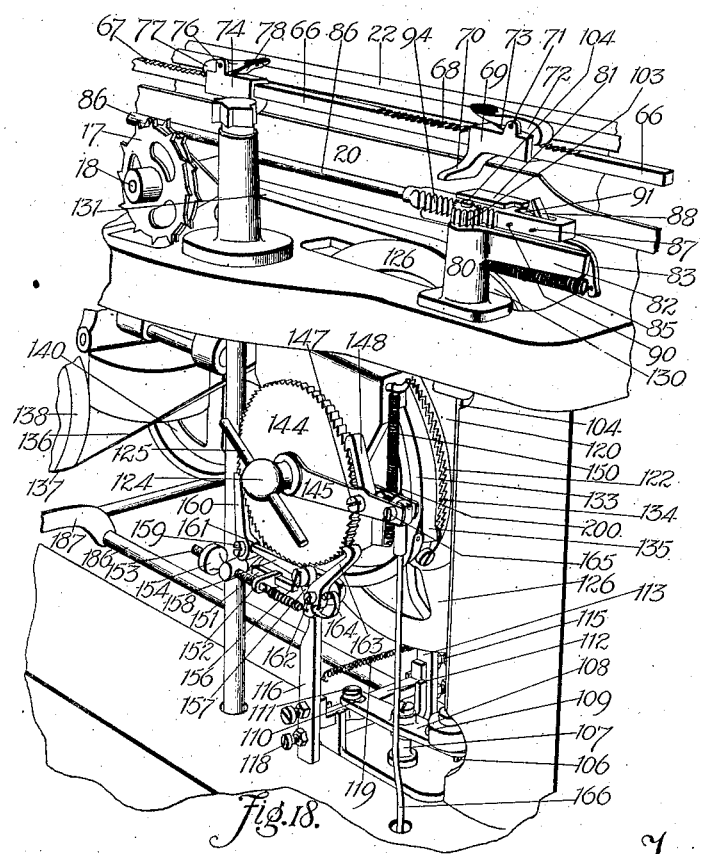
Figure 19:
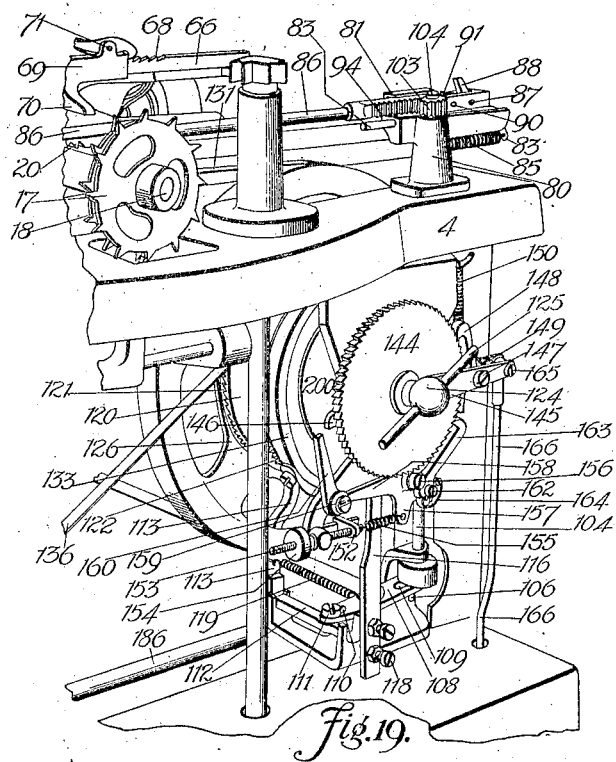
Figure 20:
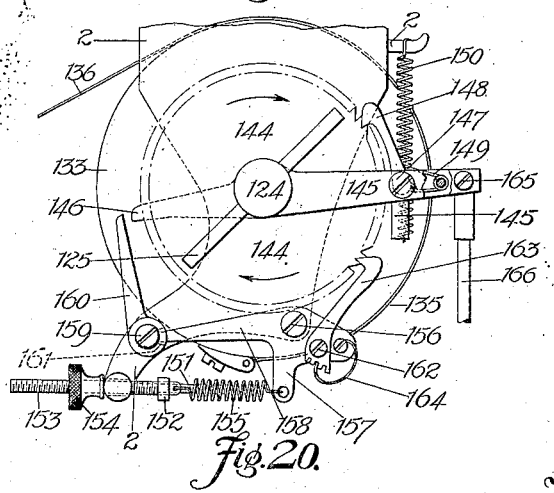
Figure 21:
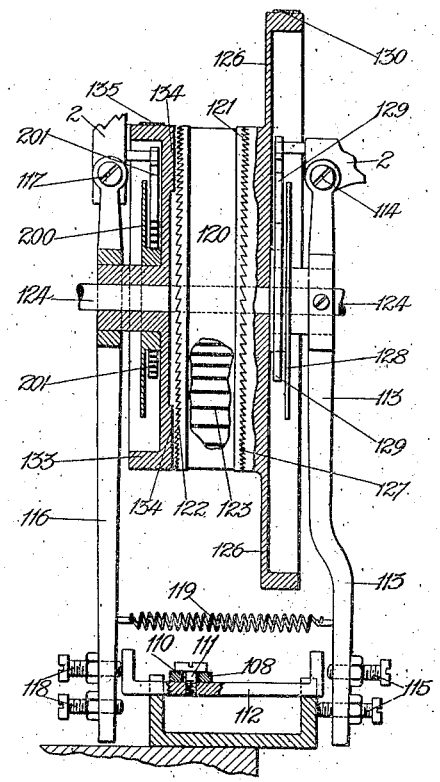
Figure 22:
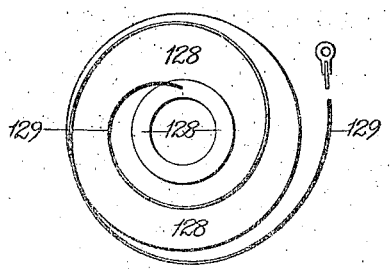

Referring to the drawings which form a part of this specification—Figure 1 is a view showing a common escapement mechanism for releasing the carriage with each depression of a key. Fig. 2 is a view showing portion of a paper roller and mechanism for adjusting the amount of the rotary travel of the said roller. Fig. 3 is a view showing a crank lever carrying a tripper. By the lever the paper roller is turned. Fig. 4 is a sectional plan view of the crank lever seen in Fig. 3 to show the tripper. Fig. 5 is a view of a hand lever for operating the crank lever seen in Fig. 3. Fig. 6 is a view of a deflector with which the tripper engages to automatically operate the crank lever seen in Fig. 3. Fig. 7 is a view showing mechanism by which the crank lever seen in Fig. 3 may be operated by a key. Fig. 8 is a view of one end of the carriage showing the relationship between various parts for turning the paper roller. Fig. 9 is a view of the same end of the carriage showing the relationship between various parts for turning the paper roller, but looking in the opposite direction or the inside of Fig. 8. Fig. 10 is a front perspective view of a typewriting machine with this invention applied. Various minor parts have been omitted for convenience of illustration. Fig. 11 is a view of a stop bar showing stops thereon. This bar is carried by the carriage. Fig. 12 is a view of portion of a bearing containing a ribbon spring by which a pinion and a reversing bar are controlled. Fig. 13 is a view of the bearing seen in Fig. 12, but showing slideway and slide thereof. Fig. 14 is a part sectional view of the left hand end of the reversing bar. Fig. 15 is a part sectional view of the right hand end of the reversing bar. Fig. 16 is a rear perspective view of a typewriting machine showing in position the stop bar, bearing and reversing bar shown in Figs. 11, 12, 13, 14 and 15. Reversing mechanism hereinafter more fully illustrated is also seen. The carriage is in a position at which the typing of a line is commenced. Fig. 17 is a back or rear view to show clearly the connection, by tapes, of reversing mechanism of the carriage. The arrows indicate the direction of movement of the various parts when a line is being written. When the carriage, automatically returns or reverses after the line has been written, the direction of travel of the parts here shown is opposite to that indicated by the arrows. Fig. 18 is a perspective view showing mainly reversing mechanism from one side thereof. The carriage is moving in the ordinary way—that is—a line is being written. Fig. 19 is a perspective view showing mainly the reversing mechanism from the other side thereof. The carriage is moving in the ordinary way—that is—a line is being written. Fig. 20 is a view of mechanism by which the tension of a spring within a driving drum is maintained. The arrows indicate the direction of travel of an axle when the spring is being wound. The recoil of the axle and a ratchet wheel secured thereto is in the opposite direction to that indicated by the arrows. Fig. 21 is an end part sectional view of the reversing mechanism. Fig. 22 is a view of a disk and a ribbon spring thereof by which tapes shown in Fig. 17 are prevented from becoming slack. Fig. 23 is a view of mechanism operated by each depression of the keys, and which itself operates the mechanism seen in Fig. 20 for maintaining the tension of the spring moving the carriage. Fig. 24 is a view showing mechanism for operating the carriage reversing mechanism, by means of a key, before the end of a line is reached. Fig. 25 is a view showing the key referred to in Fig. 24, and also the key referred to in Fig. 7.

The invention includes a framework 2, having a right hand end 3, and a left hand end 4. Slidably carried by the framework is a carriage 5 of any suitable construction. The carriage is controlled by a ribbon tension spring, hereinafter more fully referred to. The tension spring is intermittently released by the depression of keys as is usual, the carriage moving from the right toward the left hand end of the framework each time a key is depressed. A common form of mechanism for intermittently permitting the carriage to move is particularly illustrated by Fig. 1. This consists of a series of keys 6 each attached to a key lever 7 which is pivoted to the back of the framework. Beneath the key levers and extending across the framework is a cross bar 8, having at each end an upstanding lug 9. Pivoted to each lug 9 is the rear end of a lever 10, the front end of which is attached to a cross spindle 11 pivotally mounted in the framework. Between the levers 10, and secured to the spindle 11, is a lever 12 having pivotally connected thereto the lower end of a connecting rod 13. The upper end of the connecting rod 13 is pivoted to the long arm 14 of a crank lever, which latter is pivotally mounted at the rear of the framework. The short arm 15 of the crank lever has pivotally attached thereto a catch 16, engaging the teeth of an escapement wheel 17. The escapement wheel 17 has two sets of teeth and is mounted at the rear end of a spindle 18 carried by the framework. Attached to the front end of the spindle 18 is a pinion 19 engaging with a rack 20 carried by the carriage 5. The action is as follows:—Upon a key being depressed, the cross bar 8 is also depressed, and moves with it the levers 10, which move the lever 12 downwardly. The connecting rod 13 is also drawn downwardly, as is also the long arm 14 of the crank lever. The short arm 15 of the said lever then moves inwardly permitting the catch 16 to disengage from one set of teeth of the escapement wheel, but engage with the other set. The wheel 17 is thus permitted to partially rotate because of the tension spring (hereinafter described). The pinion 19 also rotates moving by the rack 20, the carriage a short distance, toward the left hand end of the framework. This mechanism is well known and illustrative only.

Mounted upon an axle 21 carried by the carriage 5 is a rotatable paper roller 22 having at its right hand end a ratchet wheel or ring 23. Mounted on the right hand end of the axle 21, adjacent to the ratchet ring 23 (Fig. 2), is a fixed racked sector 24. Adjoining the sector 24, and movably mounted upon the axle 21, is an adjusting device 25 having a limit stop 26. The adjusting device 25 also carries a finger operated retention pin 27 engaging with the fixed racked sector 24.

Movably accommodated by the axle 21 is the inner end of a lever 28. Secured to the the said lever is the outer end of a cushioning plate spring 29. In the upper end of the said lever is a hole 30 and pivoted to the said upper end, by a pivot pin 31, is a pawl 32. Projecting from the pawl 32, and engaging in the hole 30, is a pin 33. Pivoted by a pivot pin 34 to the pawl 32 is the inner end of a link 35. Pivoted (Fig. 3) to the outer end of the link 35, by a pivot pin 36, is the upper arm 37 of a crank lever. The crank lever, by a stud 38, is pivotally secured to the carriage 5. Pivoted by a pivot pin 39 to the lower arm 40 of the crank lever is a tripper 41 having (Fig. 4) a limit lip 42. Carried by the tripper 41 is a roller 43 and controlling the said tripper in its relationship to the crank lever is a spring 44.

Pivotally connected to the lower arm 40 of the crank lever is the lower end of a link 45. The upper end of the said link 45 is pivoted (Fig. 5) to the inner end of a lever 46. The outer end of the lever 46 is secured to a hand rod 47 having a finger extension 48. If desired, however, the link 45, lever 46, and hand rod 47 may be dispensed with as they are provided for convenience only.

Secured at the right hand end 3 of the framework 2, below the carriage 5, is (Fig. 6) a deflector 49, having a first pathway 50, and a second pathway 51. The roller 43 of the tripper 41 engages the pathways 50 and 51, as will be hereinafter explained.

Engaging with the upper arm 37 of the crank lever aforementioned is the free and inner end of a link 52. Formed in the said free end (Fig. 7) is a mouth 53 adjoining which is a projection 54. Pivoted by a pivot pin 55 to the outer end of the link 52 is the upper end of the lever 56. The lower end of the lever 56 is secured to the right hand end of a spindle 57 carried by the carriage. Secured to the left hand end of the spindle 57 is a toothed sector 58. Engaged by the sector 58 is a longitudinal fluted spindle mounted in bearings in the framework. Secured to the left hand end of the fluted spindle 59 is the lower end of a lever 60. Pivoted by a pivot pin 61 to the upper end of the lever 60 is the upper end of a connecting rod 62. The lower end of the connecting rod 62 is pivoted by a pivot pin 63 to a key lever 64, attached to which is a key 65. The lever 64 is pivoted to another key lever 177 hereinafter described.

Secured to the rear of the carriage 5, and extending from one end thereof to the other, is (Fig. 11), a stop bar 66 having right hand teeth 67 and left hand teeth 68. Embracing the stop bar 66 is a reversing stop. This consists of a sleeve 69 having projecting therefrom a finger 70. Pivoted by a pivot pin 71 to the sleeve 69 is an intermediately pivoted catch 72 controlled by a plate spring 73. The catch 72 engages the left hand teeth 68. Embracing the said stop bar is also a reëngagement stop. This consists of a sleeve 74 having a finger 75. Pivoted by a pivot pin 76 to the sleeve 74 is an intermediately pivoted catch 77 controlled by a plate spring 78. The catch 77 engages with the right hand teeth 67. Upstanding above the right hand end of the rear of the framework is a plain bearing 79. Upstanding above the left hand end of the rear of the framework is a bearing 80. This latter consists (Fig. 13) of a slideway 81 having a slideway extension 82. Guided by the slideway extension is a slide 83 having a recess 84. The slide is controlled by a spring 85.

Mounted in the bearings 79 and 80 is a reversing bar 86. Pivoted (Fig. 14) by a pivot pin 87 at the left hand end of the said bar is a crank lever having an upstanding tripping arm 88 and a catch arm 89. Pivoted at the left hand end of the reversing bar 86 by a pivot pin 90 is also a catch lever 91 having a mouth 92 engaged by the catch arm 89 of the crank lever. Controlling the catch lever 91 is a spring 93. The catch lever 91 engages in the recess 84. Adjoining the crank lever and the catch lever at the left hand end of the reversing bar 86 is a rack 94.

Pivoted (Fig. 15) by a pivot pin 95 at the right hand end of the reversing bar is a crank lever having a depending arm 96 and a catch arm 97. Also pivoted at the right hand end of the reversing bar, by a pivot pin 98, is a catch lever 99. This has a mouth 100 engaged by the catch arm 97 of the crank lever. The pivoted catch 99 is also controlled by a spring 101. Adjoining the depending arm 96 of the crank lever is a stop 102. This may project from the framework or from the bearing 79.

Engaging the rack 94 of the reversing bar is a pinion 103 mounted at the top of a vertical spindle 104. Controlling (Fig. 12) the spindle 104 is a ribbon spring 105. One end of this is secured to the spindle 104 while its other end is secured to the interior of the bearing 80. At the lower end of the vertical spindle 104 is a crank pin 106. Pivoted (Fig. 18) to a stud 107 upstanding from the framework is an intermediately pivoted lever 108 having an outer slot 109, and an inner slot 110. The outer slot 109 acommodates the crank pin 106. Accommodated by the inner slot 110 is a pin 111 upstanding from a slide 112.

Adjoining (Fig. 21) the slide 112 is an inner clutch lever 113. This is pivoted by a pivot pin 114, at its upper end, to the rear of the left hand end of the framework. At its lower end the clutch lever 113 is provided with adjusting screws 115, which engage with the slide 112 and with the framework. Adjoining (Fig. 21) the slide 112 is also an outer clutch lever 116. This is pivoted, by a pivot pin 117, at its upper end, to the rear of the left hand end of the framework. The outer clutch lever is provided at its lower end with adjusting screws 118. Extending between the clutch levers 113 and 116 is a contracting spring 119. Between (Fig. 21) the clutch levers is a driving drum 120 having inner teeth 121 and outer teeth 122. Within the driving drum is a coiled ribbon tension spring 123. One end—the outer end—of this is secured to the interior of the drum while the other or inner end is secured to an axle 124. The said axle is provided with a finger turner 125 by which the spring may be wound. Adjoining (Fig. 21) the driving drum and between the same and the inner clutch lever 113 is an inner clutch drum 126, having teeth 127. The drum 126 is loosely mounted on the axle 124. Secured to the inner clutch drum 126 in any suitable way is an inner disk 128 having a coiled ribbon spring 129. One end of the spring 129 is secured to the disk 128, or the boss thereof, and the other end is secured to the framework. Secured (Fig. 17) to the circumference of the inner clutch drum 126 is the winding end 130 of a first tape 131. The other or carriage end 132 of the said first tape is secured to the right hand end of the carriage 5. Between (Fig. 21) the driving drum 120 and the outer clutch lever 116 is an outer clutch drum 133 having teeth 134. The drum 133 is loosely mounted on the axle 124. Secured to the outer clutch drum 133, in any suitable way, is an outer disk 200 having a ribbon spring 201. One end of the spring 201 is secured to the disk 200, or the boss thereof, and the other end is secured to the framework. Secured (Fig. 17) to the circumference of the said drum 133 is the winding end 135 of a second tape 136. The other or cam end 137 of the said tape 136 is secured to the circumference of a cam 138. The cam 138 is mounted upon the outer end of a spindle 139 mounted upon the inner end of which is a wheel 140. Secured to the circumference of the wheel 140 is the winding end 141 of a third tape 142. The other or carriage end 143 of the third tape 142 is secured to the left hand end of the carriage 5.

Mounted (Fig. 20) upon the axle 124 is a ratchet wheel 144. Loosely accommodated by the said axle 124 are also the inner ends of two links 145—an inner and an outer—one each side of the said ratchet wheel. The inner one of the said links is provided with a link extension 146 and is therefore intermediately pivoted to the axle 124. Pivoted to the said links by a pivot pin 147 is a pawl 148 controlled by a spring 149. Controlling the links 145 is also a lifting spring 150. Protruding or forming part of the framework, adjacent the link extension 146, is a guide 151. Accommodated (Fig. 20) by the guide 151 is a slide 152 carrying a screw 153. Accommodated by the screw 153 and bearing against portion of the framework, or an extension thereof, is a nut 154. Secured to the slide 152 is one end of a spring 155. Pivoted to the framework, or an extension thereof, by a stud 156, is a crank lever having a short arm 157 and a long arm 158. To the short arm 157 is attached the other end of the spring 155. Pivoted to the framework, or an extension thereof, by a stud 159, is a disengaging tappet 160 (not engaging the wheel 144), provided in its boss with a recess 161. The end of the long arm 158 of the crank lever is accommodated by the recess 161, the said recess being of sufficient area to freely or loosely accommodate the said end. Pivoted by a pivot pin 162 to an extension of the long arm 158 of the crank lever is a holding pawl 163 controlled by a spring 164. The long arm 158 is, therefore, as shown, in fact, an intermediately pivoted lever.

Pivoted by a pivot pin 165 to the outer end of the links 145 is the upper end of a connecting rod 166. Pivotally connected (Figs. 1 and 23) to the lower end of the connecting rod 166 is the rear end of a first intermediately pivoted lever 167. The said lever by a stud 168 is pivoted to the left hand end of the framework. The front end of the lever 167 engages with a roller 169 carried by the rear end of a second intermediately pivoted lever 170. The second lever 170 is attached to the left hand end of a spindle 171 extending across the framework beneath the key levers 7. At its right hand end, the spindle 171 is provided with a lever 172. Pivoted by pivot pins 173 to the levers 170 and 172 is the cross bar 8. Depending from the cross bar 8 are lugs 174 to which are pivotally connected the rear ends of links 175, the front ends of which are pivoted to the framework or an extension thereof. The said links 175 may be controlled by a spring 176.

Pivoted to the rear of the framework is (Fig. 25) a key lever 177 having a key 178. Attached to the said key lever 177 is one end of a spring 179, the other end of which is attached to the key lever 64. Depending from the lever 177 are lugs 180 carrying a pivot pin 181 to which is pivoted the said key lever 64. Pivoted (Fig. 24) by a pivot pin 182 to the key lever 177 are the lower ends of two links 183. Pivoted by a pivot pin 184 to the upper ends of the links 183 is the front end of a lever 185. Secured to the rear end of the lever 185 is a cross spindle 186 projecting from which is a lever 187. Pivoted by a pivot pin 188 to the lever 187 is the lower end of a connecting rod 189. Pivoted (by a stud 190) to the framework is a lever 191 having an upper arm 192. Projecting from the upper arm 192 is a finger 193. This engages the aforesaid depending arm 96 as will be hereinafter understood. The said lever 191 is also provided with a lower arm 194. The lever is pivoted by its lower arm 194 to the stud 190. Pivoted to the said lever by a pivot pin 195 is the upper end of the connecting rod 189.

The cycle of operations with this invention is as follows:—Upon each depression of a key 6 or its equivalent it will be obvious that the escapement mechanism aforedescribed permits the carriage 5 to move a certain distance from right to left as in an ordinary typewriting machine. The inner clutch drum 126 is now in engagement with the driving drum 120 which is rotated by its tension spring 123. The inner clutch drum 126 is therefore being driven by the driving drum 120, the direction of travel being indicated by the arrows shown in Fig. 17. The drum 126 draws with it (each time a key is depressed and it is permitted to travel) the winding end 130 of the first tape 131. On account of the carriage end 132 of this tape being attached to the right hand end of the carriage 5 the said carriage moves in the direction indicated, i. e., from right to left. Upon the carriage 5 reaching the end of a line the finger 70 of the reversing stop encounters the upstanding arm 88 of the crank lever aforedescribed drawing it with it and lifting the catch lever 91 from engagement with the recess 84 of the slide 83. Immediately the catch lever 91 is free, the spring 105 controlling the pinion 103 in engagement with the rack 94 of the reversing bar 86, asserts itself and by its tension rotates the pinion and moves the said bar from right to left. As the bar 86 moves from right to left the depending arm 96 is freed. This has been in engagement with the stop 102. When in this position, it retains the catch lever 99 downwardly and permits the finger 75 of the reëngagement stop to pass over it with the travel of the carriage. When the arm 96, by movement of the bar 86, is disengaged from the stop 102, however, the spring 101 moves the catch lever 99 upwardly. It then projects above the bar 86. The purpose of this will be hereinafter understood. As the pinion 103 rotates, or partially rotates, it will be seen that the vertical spindle 104, being controlled by the spring 105, must also partially rotate, and, by the crank pin 106 and intermediately pivoted lever 108, operate the slide 112. This, by the pivoted clutch levers 113 and 116, throws the inner clutch drum 126 out of engagement and the outer clutch drum 133 into engagement with the driving drum 120. Immediately this occurs the tension spring 123 within the driving drum 120 drives the outer clutch drum 133 which, by the second tape 136 moves the cam 138 in the opposite direction to that indicated by the arrows shown in Fig. 17. The cam 138 turns the spindle 139 upon which it is mounted and therefore also turns the wheel 140 to which is attached the winding end 141 of the third tape 142. On account of the carriage end 143 of this tape being attached to the left hand end of the carriage 5, the said carriage moves in a reverse direction to that which it previously traversed—that is—from left to right, and thus the said carriage is returned to the position which it first occupied. As the carriage returns the finger 75 of the reëngagement stop encounters the upstanding catch lever 99. As the carriage continues in its journey the reversing bar 86 now moves with it—that is—from left to right—until the depending arm 96 of the crank lever aforedescribed encounters the stop 102. Immediately this occurs, the catch arm 97 moves downwardly carrying with it the upstanding end of the catch lever 99. The finger 75, as the carriage continues to travel, can thus pass over the said catch lever 99, which remains in the position it now occupies until the carriage once more is reversed at the end of the line. When the reversing bar 86 is moved by the return of the carriage, as described, the catch lever 91 once more engages the recess 84 and retains the bar in position. As the reversing bar 86 moves from left to right it will also be apparent that the pinion 103 is rotated by the rack 94. This not only rewinds the spring 105 but also turns the spindle 104 and crank pin 106. By the movement of the crank pin the intermediately pivoted lever 108 operates the slide 112. This by the clutch levers 113 and 116 throws the outer clutch drum 133 out of engagement and the inner clutch drum 126 once more into engagement with the driving drum 120. The carriage may once more move now, from right to left, the various parts being set to return the carriage at the end of a line as already described.

It will be seen that the reversing stop is adjustable as regards the stop bar 66 by operating the intermediately pivoted catch 72 and sliding the sleeve 69 along the said bar. The distance the carriage travels before it is returned or reversed may thereby be varied. It will also be seen that the reëngagement stop which, upon the carriage returning, engages with the catch lever 99 may also be adjusted by operating the intermediately pivoted catch 77 and moving the sleeve 74 along the said stop bar 66. The distance the carriage returns may thereby be varied. The travel of the carriage in either direction is therefore variable by adjustment of the stops upon the stop bar. It should also be pointed out that the rotation of the inner clutch drum 126 rotates the inner disk 128, the function of the spring 129 of which is to prevent the first tape 131 sagging when the inner clutch drum is disengaged from the driving drum 120. Likewise, the outer clutch drum rotates the outer disk 200 the function of the spring 201 of which is to prevent the second tape 136 and third tape 142 from sagging when the outer clutch drum is disengaged from the driving drum 120. With each depression of key 6 it will be clear that the cross bar 8 beneath the key levers 7 is depressed. This, by the levers 170 and 167 described, operates the connecting rod 166. The rod 166 in turn draws downwardly the outer end of the links 145 adjacent the ratchet wheel 144. With the links moves the pawl 148, which, being in engagement with the teeth of the ratchet wheel, partially rotates the said wheel. The spring 150 returns the said links 145 after each such movement and the holding pawl 163 before described prevents escapement of the said ratchet wheel 144. It will, therefore, be plain that as the carriage 5 moves from right to left the depression of the keys 6 operates the ratchet wheel 144 rotating the axle 124 upon which it is mounted. As one end of the tension spring 123 is secured to the axle 124 the rotation of the axle winds the said tension spring 123 within the driving drum 120 and maintains or gathers up the tension of the said spring which was lost in returning the carriage at the end of the line previously written. It should be explained that the tension of the spring 123 during the operation just described is comparatively low, or, in any case, is not high. That is to say, the spring is not fully wound, and, therefore, the pawls 148 and 163 have no difficulty in operating the ratchet wheel 144 as the recoil or tendency to unwind of the spring 123 and the tendency of the ratchet wheel 144 to recoil or follow the said spring is not severe or great.

The finger turner upon the axle 124 may, of course, be used to wind the tension spring 123 should it be desired. The automatic winding of the spring 123 has been described, but should the tension upon the said spring, be for any reason too severe, or when the said spring reaches a certain tension a continued automatic winding of the said spring is automatically prevented. Therefore, should the tension of the spring 123 run down or weaken to any material extent the said tension spring is automatically rewound as described and when, under any circumstances, sufficient tension has been obtained the winding mechanism is automatically thrown out of gear as will now be explained. It should be understood that when axle 124 is stationary the tendency of the spring 123 is to rotate the driving drum 120 in one direction, but when the drum 120 is stationary the tendency of the spring is to rotate the axle 124 and with it the ratchet wheel 144 in the opposite direction. When the spring 123 is normally wound, the ratchet wheel 144 will therefore have what may be termed a normal recoil, but when the condition of the spring 123 tends toward over-winding, the recoil of the ratchet wheel 144 will be abnormal or severe. It is obvious, then, that when the recoiling action reaches a certain stage or is abnormal the holding pawl 163 will be slightly lifted with each recoiling movement of the ratchet wheel 144. The direction of the recoil of the ratchet wheel is the opposite to that indicated by the arrows in Fig. 20. When the pawl 163 is so lifted it is clear that the long arm extension to which the pawl 163 is pivotally attached must also be lifted. The long arm 158 being actually an intermediately pivoted lever the end of it in engagement with the recess 161 of the tappet 160 now descends in the said recess and strikes its bottom or lower edge comparatively sharply. This has the effect of moving the upper end of tappet 160 inwardly and beneath the extension 146 of the inner link 145. As before described, with each downward movement of the connecting rod 166 the outer end of the links 145 to which the said rod 166 is pivotally connected also descends carrying downwardly the pawl 148 which, in consequence, operates the ratchet wheel 144. The direction of travel of the ratchet wheel when this takes place is indicated by the arrows shown in Fig. 20. The descent of the one end of the links 145 elevates the extension 146. The links 145, when a key 6 or the like which caused their descent is released, are lifted by the spring 150. If the upper end of the tappet 160 has moved inwardly and is poised beneath the link extension 146 it follows that the said extension cannot fall to its full extent and the spring 150 therefore cannot lift the pawl 148 sufficiently to enable it to engage another tooth of the ratchet wheel 144. The automatic winding mechanism is therefore out of gear. When the parts referred to are in this condition, the spring 150 cannot lift the pawl 148 and the outer end of the links 145 to their normal position, and therefore the connecting rod 166 is slightly depressed. This has the effect of slightly lowering the rear end of the lever 167, and consequently slightly elevating the front end of the said lever from the friction roller 169. This, however, has no detrimental or other effect. It may be mentioned, too, that with each movement of the ratchet wheel 144 by the pawl 148, the pawl 163 is slightly depressed. This has the effect of lowering the extension of the long arm 158 and bringing its other end into engagement with the top or upper edge of the recess 161. This throws the upper end of the tappet 160 outwardly or away from the extension 146. When the recoil of the ratchet wheel 144 is normal the outward movement of the tappet 160 is an idle one to the mechanism, but not a necessity. When the recoil of the ratchet wheel 144 is abnormal the end of the long arm 158 will be given its maximum stroke from the top to the bottom of the recess 161 through this idle movement. The consequence is that the tappet 160 moves very quickly when the recoil is abnormal and always then in position in time to prevent the link extension 146 completing its full journey, as described. By turning the nut 154 the slide 152 is moved and the tension of the spring 155 upon the short arm 157 of the crank lever either lessened or increased. The end of the long arm 158 may thereby be engaged with either the top or bottom edge of the recess 161. In addition, when the recoil of the ratchet wheel 144 is abnormal the tension of the spring 155 has to be overcome by the recoil and regulating or timing of the movement when the tappet 160 will come into complete operation may thus be effected. Should it be desired to return or reverse the carriage before the end of a line is reached such may be accomplished by depressing the key 178 thereby depressing also the key lever 177 by which it is carried. This operates, by the links 183 and lever 185, the cross spindle 186 to which is attached the lever 187. The connecting rod 189 is thereby forced upwardly operating the lever 191, the finger 193 of the upper arm 192 of which is thus brought into engagement with the depending arm 96 of the crank lever, aforedescribed, carried by the reversing bar 86. This action moves the reversing bar 86 from right to left operating the pinion 103 and spindle 104. These operate the clutch levers 113 and 116 as before described throwing the inner clutch drum 126 out of engagement and the outer clutch drum 133 into engagement with the driving drum 120. The carriage then travels toward its original position as already set forth. It is necessary for the operator to retain the key 178 depressed for as long as it is desired for the carriage to return as the catch lever 91 is still in engagement with the recess 84 of the slide 83 which latter has consequently moved with the reversing bar 86. Immediately the finger is removed from the key 178 the spring 85 returns the slide to its normal position. With the slide then moves the reversing bar 86 the rack 94 of which immediately operates the pinion 103. This disengages the outer clutch drum 133 and once more engages the inner clutch drum 126 with the driving drum 120.

As the carriage returns from the end of a line, it will be plain, that the roller 43 upon the tripper 41 engages with the pathway 51 of the deflector 49. This operates the aforedescribed crank lever which by its upper arm 37 operates the link 35 throwing the pawl 32 into engagement with the ratchet ring 23 at the end of the roller 22. The roller 22 is thus turned automatically as the carriage returns. Upon the carriage moving normally, that is, from right to left, it will be seen that the tripper 41 being pivoted to move in one direction only engages with the pathway 50 of the deflector 49 and turns or pivots upon the pivot pin 39. The crank lever therefore does not operate when the carriage 5 is so moving and the roller 22 is not then turned. Should it be desired to turn the paper roller before the end of a line is reached the key 65 is depressed drawing downwardly the connecting rod 62. By the fluted roller 59 and toothed sector 58 the spindle 57 and lever 56 now operate the link 52. This engages with the upper arm 37 of the crank lever which operates the link 35 and ratchet ring 23 as described. When the key 65 is depressed the spring 179 returns the said key; but the said spring is not strong enough to draw downwardly with it the key lever 177. When the key 178 and lever 177 are depressed the lever 64 being beneath them is depressed also. The carriage 5 is therefore not only returned as before described, but the roller 22 also rotated in the manner which has just been described. When the carriage 5 is returning under any circumstances the toothed sector 58 carried by the carriage slides along the fluted roller 59 carried by the framework 2. Upon the carriage being returned before it has reached the end of a line, it is obvious that the paper cannot be automatically turned by the tripper 41 and deflector 49 as the link 52 will be in engagement as described, with the upper arm 37 of the tripper's crank lever, the lower arm 40 of which will consequently have lifted or elevated the tripper clear of the deflector 49. Should it be desired to turn the paper by hand, the finger catch 48 of the hand rod 47 is moved and by the lever 46 and link 45 operates the crank lever, link 35 and pawl 32, as aforesaid. To adjust the amount of turn given to the roller 28 any ordinary mechanism may be used that illustrated being of a common nature. To operate the adjusting device 25 the retention pin 27 is removed from engagement with the racked sector 24, and placed within another notch of the said sector 24. This adjusts the limit stop 26 in relation to the lever 28 thereby altering the throw of the link 35.

Having now described my invention what I claim as new and desire to secure by Letters Patent is:—

1. A typewriting machine having a sliding carriage, a spring, mechanism operated by said spring for alternately moving said carriage in opposite directions, and means operated by the sliding carriage for controlling said mechanism to determine the direction of movement of the carriage.

2. A typewriting machine having a sliding carriage, a spring, mechanism operated by said spring for alternately moving said carriage in opposite directions, means for controlling said mechanism to determine the direction of movement of the carriage, and adjustable means carried by said carriage for operating said last mentioned means at varying positions of the carriage.

3. A typewriting machine having a sliding carriage, a spring, a member connected to said carriage for moving it in one direction, a second member connected to the carriage for moving it in the opposite direction, said members being alternately operated by said spring and automatically operated means for causing one or other of said members to be operated by the spring according to the direction in which the carriage is to be moved.

4. A typewriting machine having a sliding carriage, a spring, a member connected to said carriage for moving it in one direction, a second member connected to the carriage for moving it in the opposite direction, said members being alternately operated by said spring, and means operated by the sliding carriage for causing one or other of said members to be operated by the spring according to the direction in which the carriage is to be moved.

5. A typewriting machine having a sliding carriage, a spring, mechanism operated by said spring for alternately moving said carriage in opposite directions, and an automatically operated reversing bar movable in opposite directions to control said mechanism to determine the direction of movement of the carriage.

6. A typewriting machine having a sliding carriage, a spring, mechanism operated by said spring for alternately moving said carriage in opposite directions, and a reversing bar movable in opposite directions by the traveling carriage to control said mechanism to determine the direction of movement of the carriage.

7. A typewriting machine having a sliding carriage, a spring, a clutch member operated by said spring, a pair of clutch members adapted to be alternately engaged with the first mentioned clutch member, said clutch members being connected to the carriage to move the same in opposite directions and a reversing bar adapted to be moved at predetermined positions by the sliding carriage, in one direction to engage one of said clutch members and in the other direction to engage the other member to effect the desired movement of the carriage.

8. A typewriting machine having a sliding carriage, a spring, mechanism operated by said spring for alternately moving said carriage in opposite directions, a reversing bar movable in opposite directions to control said mechanism, a spring for moving said bar in one direction, means for normally retaining said bar against movement by said spring, means for releasing said means to allow the spring to move said bar and thereby operate said mechanism to move the carriage in one direction and means for returning said bar to normal position to operate the mechanism to move the carriage in the opposite direction.

9. A typewriting machine having a sliding carriage, a spring, mechanism operated by said spring for alternately moving said carriage in opposite directions, a spindle, and means for automatically causing the rotation of said spindle to control the operation of said mechanism to determine the direction of movement of the carriage.

10. A typewriting machine having a sliding carriage, a spring, mechanism operated by said spring for alternately moving said carriage in opposite directions, a spindle, and means carried by said carriage for causing the rotation of said spindle to control the operation of said mechanism to determine the direction of movement of the carriage.

11. A typewriting machine having a sliding carriage, a spring, mechanism operated by said spring for alternately moving said carriage in opposite directions, a spindle adapted to be rotated in opposite directions to control said mechanism, a spring for rotating said spindle in one direction, means for normally retaining said spindle against movement by said spring, means for releasing said spindle to operate said mechanism to move the carriage in one direction and means for rotating said spindle in the opposite direction to operate the mechanism to move the carriage in the other direction.

12. A typewriting machine having a sliding carriage, a spring, mechanism operated by said spring for alternately moving said carriage in opposite directions, a reversing bar adapted to be moved in opposite directions, a rack carried by said bar, a spindle, a pinion on said spindle gearing with said rack, means for moving said bar and spindle to cause the movement of the carriage in one direction, and means for moving said bar in the opposite direction to rotate the spindle to cause the movement of the carriage in the other direction.

13. A typewriting machine having a sliding carriage, a spring, mechanism operated by said spring for alternately moving said carriage in opposite directions, a reversing bar adapted to be moved in opposite directions, a rack carried by said bar, a spindle, a pinion on said spindle gearing with said rack, a spring tending to rotate the spindle and thereby move said bar in one direction, means for normally preventing movement of said bar by said spring, means for releasing said bar to allow rotation of the spindle to cause the movement of the carriage in one direction, and means for moving said bar in the opposite direction to rotate the spindle to cause the movement of the carriage in the other direction.

14. A typewriting machine, having a sliding carriage, a spring, a clutch member operated by said spring, a pair of clutch members adapted to be alternately engaged with the first mentioned clutch member, said clutch members being connected to the carriage to move the same in opposite directions, a pivoted operating lever for each clutch member, a spring connected at its ends to said levers, a slide arranged between said levers and movable in opposite directions, and means for operating said slide to engage one or other of said levers and thereby move the corresponding clutch member out of engagement with the first clutch member and move the other clutch member into engagement therewith through said spring and the other lever.

15. A typewriting machine having a sliding carriage, a spring, mechanism operated by said spring for alternately moving said carriage in opposite directions, a slide operable in opposite directions to control the operation of said mechanism to determine the direction of movement of the carriage, a pivoted lever engaging said slide for operating the same, a spindle adapted to be rotated, and a crank pin carried by said spindle for operating said pivoted lever.

16. A typewriting machine having a sliding carriage, a spring, mechanism operated by said spring for alternately moving said carriage in opposite directions, a reversing bar movable in opposite directions to control said mechanism, a spring for moving said bar in one direction, a pivoted catch on said bar, a stop engaged thereby, a crank lever on said bar engaging said catch, and means for operating said lever to release said catch from said stop to allow the spring to move the bar and operate said mechanism.

17. A typewriting machine having a sliding carriage, a spring, mechanism operated by said spring for alternately moving said carriage in opposite directions, a reversing bar movable in opposite directions to control said mechanism, a pivoted catch on said bar, a bell-crank lever on said bar engaging said catch, means for engaging said catch to move said bar to operate said mechanism and means for engaging said lever to release said catch from said means after the operation of the said mechanism thereby.

18. A typewriting machine having a sliding carriage, a spring, mechanism operated by said spring for alternately moving said carriage in opposite directions, means for controlling said mechanism to determine the direction of movement of the carriage, a stop bar carried by said carriage, teeth formed on said bar, catches engaging therewith and adjustable stops carrying said catches and supported by said bar for operating the last mentioned means at varying positions of the carriage.

19. A typewriting machine having a sliding carriage, a spring, mechanism operated by said spring for alternately moving said carriage in opposite directions, a reversing bar for controlling the operation of said mechanism, spring-actuated means for normally retaining said bar against movement, means for positively moving said bar against the action of said spring-actuated means to cause said mechansim to move the carriage in one direction, said bar being returned by said spring-actuated means to cause the mechanism to move the carriage in the opposite direction.

20. A typewriting machine having a sliding carriage, a spring, mechanism operated by said spring for alternately moving said carriage in opposite directions, a rotatable spindle for controlling the operation of said mechanism, spring actuated means for normally retaining said spindle against rotation, and means for positively rotating said spindle against the action of said spring-actuated means to cause said mechanism to move the carriage in one direction, said spindle being rotated in the opposite direction by said spring-actuated means to cause the mechanism to move the carriage in the other direction.

21. A typewriting machine having a sliding carriage, a spring, mechanism operated by said spring for alternately moving said carriage in opposite directions, a rotatable spindle for controlling the operation of said mechanism, a pinion secured to said spindle, a rack bar engaging said pinion, a spring operating on said bar to normally retain said spindle against rotation, and means for positively moving said rack bar against the action of said spring to rotate said spindle to cause said mechanism to move the carriage in one direction, said spindle being rotated in the opposite direction by said spring-actuated means to cause the mechanism to move the carriage in the other direction.

22. In a typewriting machine having a sliding carriage, a tension spring, a driving drum operated by said spring, clutch drums adjoining the driving drum, a spindle, means for rotating said spindle at predetermined positions of the carriage, and means for operating the clutch drums by the rotation of said spindle.

23. In a typewriting machine having a sliding carriage, a tension spring, a driving drum operated by said spring, clutch drums adjoining the driving drum, a slide, means for operating said slide at predetermined positions of the carriage, and means for operating the clutch drums by the operation of the said slide.

24. In a typewriting machine having a sliding carriage, a tension spring, a driving drum operated by said spring, clutch drums adjoining the driving drum, a stop bar carried by the carriage and having adjustable stops thereon, and means operated by the stops for actuating the clutch drums when the carriage reaches predetermined positions.

25. In a typewriting machine having a sliding carriage, a tension spring, a driving drum operated by said spring, clutch drums adjoining the driving drum, a reversing bar, a stop bar carried by the carriage, adjustable stops upon said stop bar and engaging the reversing bar, and means for operating the clutch drums by movement of the reversing bar.

26. In a typewriting machine having a sliding carriage, a tension spring, a driving drum operated by said spring, clutch drums adjoining the driving drum, a clutch lever controlling each clutch drum, a reversing bar, means for operating said reversing bar at predetermined positions of the carriage, a spindle operated by each movement of the reversing bar, and means for operating the clutch levers with each movement of the spindle.

27. In a typewriting machine having a sliding carriage, a tension spring, a driving drum operated by said spring, clutch drums adjoining the driving drum, a clutch lever controlling each clutch drum, a slide engaging said clutch levers, a reversing bar, a stop bar carried by the carriage, adjustable stops upon said bar engaging the reversing bar at predetermined positions of the carriage, a spindle operated by each movement of the reversing bar, and means for operating the slide by movement of the spindle.

28. In a typewriting machine having a sliding carriage, a driving drum, a coiled ribbon tension spring within said drum, an inner clutch drum and an outer clutch drum adjoining said driving drum, a first tape secured at its one end to said inner clutch drum and at its other end to the carriage, a second tape, a cam, said second tape being attached at its one end to said outer clutch drum and at its other ends to said cam, a wheel controlled by said cam, a third tape attached at its one end to said wheel and at its other end to the carriage, and means to prevent said tapes sagging.

29. In a typewriting machine having a sliding carriage, a slide, a spring controlling said slide, a reversing bar engaged with said slide, means carried by the carriage for operating said reversing bar and disengaging it from the slide, means for operating said reversing bar independently of the carriage and without disengaging it from the slide, a clutch mechanism, and means for operating the clutch mechanism with each movement of the reversing bar.

30. In a typewriting machine having a sliding carriage, a reversing bar, means for operating said reversing bar, a pinion engaged by said reversing bar, a spindle operated by said pinion, a ribbon spring controlling said spindle, and a clutch mechanism operated by said spindle.

31. In a typewriting machine having a sliding carriage, a reversing bar, a crank lever pivoted to said bar and having a depending arm and a catch arm, a spring controlled catch lever engaged by the catch arm, a stop engaged by the depending arm, and a stop carried by said carriage and engaging the catch lever.

32. In a typewriting machine having a sliding carriage, a reversing bar, a pinion operated by said reversing bar, a spindle secured to said pinion, a ribbon tension spring controlling said spindle, an intermediately pivoted lever operated by said spindle, a slide controlled by said lever, an inner clutch lever and an outer clutch lever controlled by said slide, a spring uniting said levers, an inner clutch drum controlled by the inner clutch lever, an outer clutch drum controlled by the outer clutch lever, a driving drum between said clutch drums, a coiled ribbon tension spring within said driving drum, and tapes secured to the clutch drums and passing to the carriage.

33. In a typewriting machine having a sliding carriage, a tension spring, means to move the carriage in either of two directions by said spring, means for winding said spring when moving the carriage in one direction, and means operated by the spring for disengaging the winding means when the spring is sufficiently wound.

34. In a typewriting machine having a sliding carriage, a key lever, links pivoted thereto, a spindle, a connecting rod, arms projecting from said spindle and connected respectively to said links and connecting rod, a lever connected to the other end of said connecting rod, a reversing bar engaged by said lever, and a clutch mechanism controlled by said reversing bar.

In testimony whereof I affix my signature in presence of two witnesses.

LESLIE HAROLD FRIEDMAN.

Witnesses:
CECIL M. SLASTINE,
ALAN McCACHEN.